United States Patent Office 3,739,024
Patented June 12, 1973

3,739,024
PRODUCTION OF ALPHACHLOROTHIOAMIDE DERIVATIVES
John P. Chupp, Kirkwood, Mo., assignor to Monsanto Company, St. Louis, Mo.
No Drawing. Continuation-in-part of application Ser. No. 868,625, Oct. 22, 1969, which is a continuation-in-part of application Ser. No. 842,372, July 16, 1969, now Patent No. 3,594,394. This application Dec. 20, 1971, Ser. No. 210,209
Int. Cl. C07c *153/05*
U.S. Cl. 260—551 S          8 Claims

ABSTRACT OF THE DISCLOSURE

A process for preparing α-chlorothioamides by the reaction of an α-chloroamide with a thionophosphine sulfide. These compounds possess herbicidal activity.

---

This application is a continuation-in-part of copending application Ser. No. 868,625, filed Oct. 22, 1969, now abandoned which in turn is a continuation-in-part of application Ser. No. 842,372, filed July 16, 1969, now U.S. Pat. 3,594,394.

This invention relates to a novel procedure for the production of α-chlorothioamides.

The thionation of α-chloro-acetamides by conventional reagents, such as $P_2S_5$, usually requires high temperatures, with a resultant side reaction of the reagent with the α-chloro atom as well as the carbonyl oxygen atom, thus resulting in low yields of the desired α-chlorothioamide. The scarcity of N-substituted α-chlorothioamides in the literature is probably due to this difficulty. Most attempts to thionate α-chloro-acetamides by conventional methods have either failed altogether, or resulted in conversion only at a very slow rate.

It is an object of this invention to provide a novel process by which the thionation of an α-chloro-acetamide can be easily achieved, and at moderate temperatures.

In accordance with this invention, it has been discovered that α-chloro-acetamides may be easily thionated by a novel method which comprises reacting an α-chloroacetamide of the formula $$Cl-CH_2-\overset{O}{\underset{\|}{C}}-\underset{\underset{R}{|}}{N}-R^1$$

wherein $R^1$ has at least 1 and a maximum of 12 carbon atoms, and is selected from the group consisting of alkyl, alkoxyalkyl, alkenyl, and the group $R^2-O-R^3-O-R^4$ wherein $R^2$ and $R^3$ are alkylene having a maximum of four carbon atoms, and $R^4$ is alkyl having a maximum of four carbon atoms; R has at least 1 and a maximum of 14 carbon atoms and is selected from the group consisting of alkyl, alkenyl and a substituted phenyl of the formula

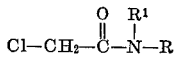

wherein Y is independently selected from the group consisting of alkyl having a maximum of four carbon atoms, halogen (Cl, Br and I), and nitro; and $m$ is an integer from 0 to 2, inclusive; with a thionophosphine sulfide of the formula

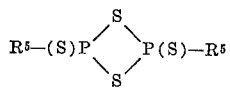

wherein $R^5$ is selected from the group consisting of alkyl having at least 1 and a maximum of 4 carbon atoms, alkenyl having at least 3 and a maximum of 6 carbon atoms, and a substituted phenyl of the formula

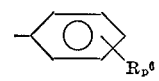

wherein $R^6$ is independently selected from the group consisting of alkyl having at least 1 and a maximum of 4 carbon atoms, and halogen; and $p$ is an integer from 0 to 2 inclusive.

Preferably, $R^1$ has a maximum of six carbon atoms, R has a maximum of 10 carbon atoms, both $R^1$ and R being as defined above, and $R^5$ is alkyl having a maximum of three carbon atoms or phenyl.

The process of the present invention can be carried out in the presence or absence of a solvent medium. It is preferred, however, to effect the process in an organic solvent medium such as benzene, chlorobenzene, carbon tetrachloride, carbon disulfide and the like, the preferred medium being carbon disulfide. The mole ratio of the α-chloroacetamide to the thionophosphine sulfide is not critical and substantially any mole ratio is feasible in carrying out the process of the present invention. Because of economic and efficiency considerations, however, the mole ratio of the acetamide to the sulfide is normally in the range of about 1.5:1 to about 4:1. In the preferred method of operation, the mole ratio of α-chloroacetamide to thionophosphine sulfide is in the approximate range of 2.5:1 to 3:1, and generally speaking, optimum results are obtained with a mole ratio of approximately 8:3.

Reaction temperatures within the approximate range of —50° C. to 220° C. are feasible but the reaction is usually conducted at a temperature within the range of about 20° C. to about 50° C. with acetamides having moderate steric hindrance, the preferred temperature range being between 20° C. and 30° C. The minimum temperature is the freezing point of the solvent medium. At temperatures above 220° C., the formation of by-products may become noticeable and objectionable. While 50° C. is generally the upper limit of the preferred range for the thionation of acetamides that are moderately hindered, temperatures above 50° C. are usually employed for the thionation of more sterically hindered α-chloroacetamides that resist thionation at milder temperatures. The time of the reaction varies, being dependent upon the nature of the reactants, the absence or presence of solvent, and the reaction temperature but is usually from about 20 minutes to about 24 hours. The process of the present invention can be carried out under sub-atmospheric pressure or super-atmospheric pressure but it is preferred to operate at atmospheric pressure.

Suitable thionophosphine sulfides for the practice of this invention are phenylthionophosphine sulfide, methylthionophosphine sulfide, tolylthionophosphine sulfide, ethylthionophosphine sulfide, N-propylthionophosphine sulfide, isopropylthionophosphine sulfide, N-butylthionophosphine sulfide, and the like.

Following the reaction, the desired product is separated and purified by conventional procedures such as filtration, decantation, chromatography, and recrystallization from various organic solvents.

The following examples illustrate the present invention and are not to be construed as limiting. Parts are by weight unless otherwise stated.

EXAMPLE 1

α-Chloro-N-isopropyl-thioacetanilide was prepared by the following procedure:

A suitable vessel equipped with agitating means, was charged with 16.8 parts of α-chloro-N-isopropylacetanilide, 10.8 parts of phenylthionophosphine sulfide and 80 parts of carbon disulfide. The resulting mixture was maintained, with agitation, for about 6 hours at room temperature. The solvent was then removed from the reaction mixture and the residue dissolved in methylene chloride. The methylene chloride solution was eluted through an alumina column. The eluted material was stripped of solvent yielding a crystalline solid which was recrystallized from an aqueous methanol solution, giving a 78% yield of the desired product. The yellow crystalline material, melting at 67–68° C., was identified by NMR and mass spectrometry as α-chloro-N-isopropylthioacetanilide.

Analysis for $C_{11}H_{14}ClNS$ (percent): Calc'd: Cl, 15.57; N, 14.08. Found (percent): Cl, 15.11; N, 13.74.

EXAMPLE 2

α-Chloro-N,N-diallyl-thioacetamide was prepared according to the following procedure:

A suitable vessel equipped with agitating means was charged with 35 parts of α-chloro-N,N-diallyl-acetamide and 28 parts of phenylthionophosphine sulfide. The resulting mixture was maintained, with agitation for about 4 hours at room temperature. Methylene chloride was then added, and the mixture filtered. The filtrate was then eluted through an alumina column, the eluted material was stripped of solvent yielding an amber oil, identified by NMR as α-chloro-N,N-diallyl-thioacetamide.

EXAMPLE 3

α-Chloro-N-methoxymethyl - 2′,6′ - diethyl-thioacetanilide was prepared by the following procedure:

A suitable vessel equipped with refluxing means was charged with 32 parts of α-chloro-N-methoxymethyl-2′,6′-diethylacetanilide, 20 parts of phenylthionophosphine sulfide, and 80 parts of carbon disulfide. The resulting mixture was refluxed for about 10 hours. The solvent was then removed from the reaction mixture, leaving a viscous oil. The viscous oil was dissolved in methylene chloride and eluted through an alumina column to give, after vacuum solvent removal, α-chloro-N-(methoxymethyl)-2′,6′-diethyl-thioacetanilide, as a viscous oil. The product was identified by IR and NMR.

EXAMPLE 4

α-Chloro-N-methyl-2′-tertiarybutyl - 6′ - ethyl-thioacetanilide was prepared using methylthionophosphine sulfide as the thionating agent by the following procedure:

A suitable vessel equipped with refluxing means, was charged with 16 parts of α-chloro-N-methyl-2′-tertiarylbutyl-6′-ethyl-acetanilide, 10 parts of methylthionophosphine sulfide, and 80 parts of carbon disulfide. The resulting mixture was refluxed for about 20 hours. The solvent was then removed from the reaction mixture and the residue dissolved in methylene chloride. The methylene chloride solution was eluted through an alumina column. The eluted material was stripped of solvent yielding a crystalline solid which was recrystallized from an aqueous methanol solution, giving an 80% yield of the desired product. The yellow crystalline material, melting at 56.5–57° C., was identified by NMR as α-chloro-N-(methyl)-2′-tertiarybutyl-6′-ethyl-thioacetanilide.

Analysis for $C_{15}H_{22}ClNS$ (percent): Calc'd: Cl, 12.49; N, 4.93; S, 11.30. Found (percent): Cl, 12.70; N, 5.08; S, 11.71.

Following the procedure of the foregoing examples, and using the appropriate α-chloroacetamide, the following α-chlorothioamides were prepared.

| Example: | Compound |
|---|---|
| 5 | α-chloro-N-methyl-2′-methyl - 6′ - tertiary-butyl-thioacetanilide. |
| 6 | α-chloro-N-isobutoxymethyl - 2′,6′ - dimethyl-thioacetanilide. |
| 7 | α-chloro-N-isopropyl-4′-nitrothioacetanilide |
| 8 | α-chloro-N-methyl-2′,6′-dimethyl-thioacetanilide |
| 9 | α-chloro-N-sec-butyl-thioacetanilide |
| 10 | α-chloro-N-methyl-2′-isopropyl-thioacetanilide |
| 11 | α-chloro-N-ethyl-2′-methyl-thioacetanilide |
| 12 | α-chloro-N-isopropyl-2′-methyl-thioacetanilide |
| 13 | α-chloro-N-isopropyl-2′-ethyl-thioacetanilide |
| 14 | α-chloro-N-propyl-thioacetanilide |
| 15 | α-chloro-N-isopropoxymethyl - 2′,6′ - dimethyl-thioacetanilide |
| 16 | α-chloro-N-methoxymethyl - 2′ - methyl-6′-ethyl-thioacetanilide |
| 17 | α-chloro-N-3-methoxybutoxymethyl - 2′,6′ - dimethyl-thioacetanilide |
| 18 | α-chloro-N-2-ethoxyethyl - 2′,6′ - dimethylthioacetanilide |
| 19 | α-chloro-N-ethoxymethyl - 2′ - methyl-6′-ethyl-thioacetanilide |
| 20 | α-chloro-N-2-methoxyethyl - 2′,6′ - diethyl-thioacetanilide |
| 21 | α-chloro-N-methyl-thioacetanilide |
| 22 | α-chloro-N-ethoxymethyl - 2′,6′ - diethyl-thioacetanilide |
| 23 | α-chloro-N-2-ethoxyethyl - 2′,6′ - diethyl-thioacetanilide |
| 24 | α-chloro-N-methoxymethyl - 2′ - methyl-6′-isobutyl-thioacetanilide |
| 25 | α-chloro-N-butoxymethyl - 2′,6′ - diethylthioacetanilide |
| 26 | α-chloro-N,N-didodecyl-thioacetamide |
| 27 | α-chloro-N,N-dihexyl-thioacetamide |
| 28 | α-chloro-N,N-dipentenyl-thioacetamide |
| 29 | α-chloro-N-allyl-N-hexyl-thioacetamide |
| 30 | α-chloro-N-butyl-N-hexenyl-thioacetamide |
| 31 | α-chloro-N-octyl-N-allyl-thioacetamide |
| 32 | α-chloro-N,N-dipropyl-thioacetamide |
| 33 | α-chloro-N,N-diethyl-thioacetamide |
| 34 | α-chloro-N-methyl-N-dodecenyl-thioacetamide |
| 35 | α-chloro-N-propyl-N-decyl-thioacetamide |
| 36 | α-chloro-N,N-didodecenyl-thioacetamide |

The compounds of this invention possess herbicidal activity as illustrated by the following example.

EXAMPLE 37

A good grade of top soil is placed in aluminum pans and compacted to a depth of ⅜″ to ½″ from the top of each pan. A predetermined number of seeds of each of several plant species are placed on top of the soil in the pans.

The seeds are covered with a ⅜″ layer of prepared soil and the pan leveled. The active ingredient, α-chloro-N-methyl-thioacetanilide, is applied to the surface by spraying in an amount equivalent to 5 lbs./acre.

The seed-containing pans are placed on a wet sand bench and maintained for approximately 14 days under ordinary conditions of sunlight and watering. The plants are observed at the end of approximately 14 days and the results recorded. The herbicidal activity index is based on the average percent germination of each seed lot. The activity index is converted to a relative numerical scale for the sake of brevity and simplicity in the examples.

The pre-emergent herbicidal activity index used in the following table is defined as follows:

| Numerical scale: | Herbicidal activity |
|---|---|
| 0 | No herbicidal activity. |
| 1 | Slight herbicidal activity. |
| 2 | Moderate herbicidal activity. |
| 3 | Severe herbicidal activity. |

The observed data is set forth in the following table wherein the botanical type is identified by an initial in accordance with the following code:

A—Morningglory
B—Wild oat
C—Brome grass
D—Rye grass
E—Radish
F—Sugar beets
G—Foxtail
H—Crab grass
I—Pigweed
J—Soybean
K—Wild buckwheat
L—Tomato
M—Sorghum

TABLE I
[Pre-emergent herbicidal activity]

| Compound of Example No. | A | B | C | D | E | F | G | H | I | J | K | L | M |
|---|---|---|---|---|---|---|---|---|---|---|---|---|---|
| 1  | 0 | 2 | 3 | 3 | 0 | 0 | 3 | 3 | 3 | 0 | 0 | 0 | 2 |
| 5  | 1 | 3 | 3 | 3 | 2 | 3 | 3 | 3 | 3 | 0 | 2 | 2 | 3 |
| 6  | 2 | 3 | 3 | 3 | 3 | 3 | 3 | 3 | 3 | 0 | 1 | 3 | 3 |
| 10 | 0 | 3 | 3 | 3 | 0 | 1 | 3 | 3 | 1 | 0 | 0 | 0 | 3 |
| 13 | 0 | 0 | 3 | 2 | 0 | 0 | 3 | 3 | 1 | 0 | 2 | 0 | 3 |
| 15 | 0 | 3 | 3 | 3 | 0 | 1 | 3 | 3 | 3 | 0 | 1 | 3 | 3 |
| 16 | 1 | 3 | 3 | 3 | 0 | 2 | 3 | 3 | 3 | 0 | 0 | 2 | 3 |
| 17 | 0 | 3 | 3 | 3 | 0 | 0 | 3 | 3 | 1 | 0 | 0 | 0 | 3 |
| 18 | 0 | 3 | 3 | 3 | 0 | 2 | 3 | 3 | 3 | 0 | 0 | 0 | 3 |
| 19 | 0 | 3 | 3 | 3 | 0 | 1 | 3 | 3 | 3 | 0 | 2 | 2 | 3 |
| 20 | 0 | 3 | 3 | 3 | 0 | 1 | 3 | 3 | 3 | 0 | 0 | 0 | 3 |
| 21 | 2 | 2 | 3 | 3 | 3 | 3 | 3 | 3 | 3 | 0 | 2 | 0 | 1 |

Various changes and modifications of the invention can be made, and to the extent that such variations incorporate the spirit of this invention, they are intended to be included within the scope of the appended claims.

What is claimed is:

1. A process for preparing an α-chlorothioamide which comprises reacting an α-chloro-acetamide of the formula

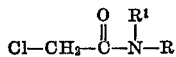

wherein $R^1$ has at least 1 and a maximum of 12 carbon atoms, and is selected from the group consisting of alkyl, alkoxyalkyl, alkenyl and the group consisting of $R^2$—O—$R^3$—O—$R^4$ in which $R^2$ and $R^3$ are alkylene having a maximum of four carbon atoms, and $R^4$ is alkyl having a maximum of four carbon atoms; and R has at least 1 and a maximum of 14 carbon atoms, and is selected from the group consisting of alkyl, alkenyl, and a substituted phenyl of the formula

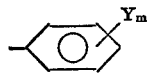

wherein Y is independently selected from the group consisting of alkyl having a maximum of 4 carbon atoms, chloro, bromo, iodo and nitro; and m is an integer from 0 to 2 inclusive; with a thionophosphine sulfide of the formula

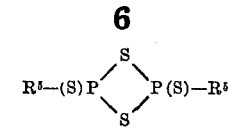

wherein $R^5$ is selected from the group consisting of alkyl having at least 1 and a maximum of 4 carbon atoms, alkenyl having at least 3 and a maximum of 6 carbon atoms, and a substituted phenyl of the formula

wherein $R^6$ is independently selected from the group consisting of alkyl having at least 1 and a maximum of 4 carbon atoms, chloro, bromo and iodo; and p is an integer from 0 to 2 inclusive.

2. A process in accordance with claim 1 in which $R^1$ has a maximum of 6 carbon atoms and said R has a maximum of 10 carbon atoms.

3. A process in accordance with claim 2 wherein said reaction is conducted in a temperature range of from about 20° to about 50° C., in the presence of an organic medium, and said thionophosphine sulfide is diphenylthionophosphine sulfide.

4. A process in accordance with claim 3 wherein said reaction is conducted in a temperature range of from about 20° C. to about 30° C., and said organic medium is carbon disulfide.

5. A process according to claim 4 wherein said α-chloroacetamide and said thionophosphine sulfide are employed in a mole ratio of approximately 8 to 3.

6. A process in accordance with claim 1 in which said α-chloroacetamide is α-chloro-2′,6′-diethyl-N-methoxymethyl acetanilide.

7. A process in accordance with claim 1 in which said α-chloroacetamide is α-chloro-N-isopropyl acetanilide.

8. A process in accordance with claim 1 wherein the reaction is conducted in a temperature range of from about 20° C. to about 50° C. and wherein the α-chloroacetamide and the thionophosphine sulfide are employed in a mole ratio within the range of from about 1.5:1 to about 4:1.

References Cited
UNITED STATES PATENTS 3,336,378  8/1967  Maier _____ 260—545

HARRY I. MOATZ, Primary Examiner

U.S. Cl. X.R.

260—562 B